Jan. 24, 1933.  A. J. LEWIS  1,895,078
MULTIPLE SPINDLE LATHE
Filed Oct. 18, 1930  5 Sheets-Sheet 1

Fig. 1.

Inventor
Arthur J. Lewis
By Worter Davis
Attorneys

Jan. 24, 1933.  A. J. LEWIS  1,895,078
MULTIPLE SPINDLE LATHE
Filed Oct. 18, 1930  5 Sheets-Sheet 2

Inventor
Arthur J. Lewis
By Wooster & Davis
Attorneys

Jan. 24, 1933.   A. J. LEWIS   1,895,078
MULTIPLE SPINDLE LATHE
Filed Oct. 18, 1930   5 Sheets-Sheet 4

Fig. 5.

Inventor
Arthur J. Lewis
By Wooster & Davis
Attorneys

Jan. 24, 1933.　　　A. J. LEWIS　　　1,895,078
MULTIPLE SPINDLE LATHE
Filed Oct. 18, 1930　　5 Sheets-Sheet 5

Fig. 6.

Inventor
Arthur J. Lewis
By
Wooster & Davis
Attorneys.

Patented Jan. 24, 1933

1,895,078

UNITED STATES PATENT OFFICE

ARTHUR J. LEWIS, OF STRATFORD, CONNECTICUT, ASSIGNOR TO THE BAIRD MACHINE COMPANY, OF STRATFORD, CONNECTICUT, A CORPORATION OF CONNECTICUT

MULTIPLE SPINDLE LATHE

Application filed October 18, 1930. Serial No. 489,584.

This invention relates to a multiple spindle lathe in which a number of different machining operations may be performed on a plurality of different pieces of work at one time, and more particularly to a construction in which pieces of work are carried on centers for different turning or similar operations. It has for an object to provide a machine with a number of different pairs of supports or aligned centers for carrying the work to be operated upon, and which are carried on a rotatable support which may be indexed to carry the work to different working stations at which different turning or similar operations may be performed on the work.

It is also an object of the invention to provide a construction of this character in which any slack or looseness between the work and the supporting centers is taken up between successive working operations.

It is another object of the invention to provide a machine of this character in which one of the work supporting centers is mounted to move toward or from its aligned center with means for automatically clamping the movable center during working operations and releasing it between these operations, and with means for shifting it toward the aligned center when released to take up any looseness or back lash which may be present between the work and the supporting centers.

It is a further object of the invention to provide a machine having an indexing turret carrying a plurality of work spindles having means for supporting one end of the work with an extension connected to the turret and movable therewith extending from the turret within the path of movement of the centers of the spindles and carrying tail centers for supporting the other ends of the work, together with tool carriers located outside the path of movement of the centers.

Another object of the invention is to provide a feed for a plurality of different tools which comprises a single feed motion with means for driving the plurality of tools at different strokes and all receiving their motion from the single feed motion.

Another object is to provide a machine of this character having a plurality of pairs of aligned work supporting centers which may be indexed to carry the work to different stations, with means at one or more of the stations whereby the tail centers may be manually withdrawn to permit loading of the work, and with spring means for automatically holding the tail centers against the work.

Still another object is to provide a machine of this type in which there may be two loading stations so that two spindles may be loaded at once, with a manually operated means for releasing the center mechanisms at these stations whereby a continuous motion will release first one center and then the other, and wherein a reversal of motion will allow one center to engage the work before the other; and further to provide an indexing mechanism whereby the work may be indexed two stations at a time, so that one series of operations may be performed in one set of stations and a different series of operations performed on the same or different work in the remaining stations as a continuously operating machine.

With the foregoing and other objects in view the invention consists in certain novel features of construction, combinations and arrangements of parts as will be more fully disclosed in connection with the accompanying drawings, it being of course understood, that various modifications may be employed to attain the various objects and to carry out the different operations desired.

In these drawings:

Fig. 7 is a detail section on line 7—7 of Fig. 2.

The machine illustrated comprises a frame including a bed section 10 and upper section 11 mounted on the bed. The machine is illustrated as being of the horizontal type, that is with the indexing turret rotating about a horizontal axis, but it will of course be understood the principles of the invention may be applied to a so-called vertical machine in which the turret rotates about a vertical axis. In the present machine an indexing turret 12 is mounted in the frame to turn in an outer ring 13 secured to the frame by any suitable means such as bolts 14. This turret is also mounted on a central supporting member 15 which is secured to the turret so as to turn therewith, in the present instance by suitable screws 16. This member 15 extends forwardly from the turret, and outwardly of the turret carries a supporting block 17 which is connected to the member 15 to turn with it by any suitable means such as a key 18. Thus, the members 15 and 17 form an extension in the turret and rotate with it during the indexing operation. The extension member 15 has bearings at its opposite ends in the frame of the machine as indicated at 19 and 20, and it will be noted that as they are at opposite ends of the turret and the extension and located in the frame of the machine, the turret and its extension are very rigidly supported so that the machine may operate indefinitely without their working out of alignment, and providing a very rigid and accurate construction. To facilitate easy indexing of the turret and the extension these bearings are preferably antifriction bearings such as roller or ball bearings as illustrated.

Mounted in the turret 12 are a plurality of work spindles 21 running in suitable bearings in the turret. In the present instance there are six of these spindles in the turret, but their number may be varied as is found desirable and practical. These spindles provide a plurality of loading and working stations, and, depending on how the machine is operated, there may be one or two or more loading stations and the remaining are working stations. Ordinarily with a six spindle machine there is either one loading station and five working stations, or two loading stations and four working stations but the numbers may be varied as desired.

Figure 1:
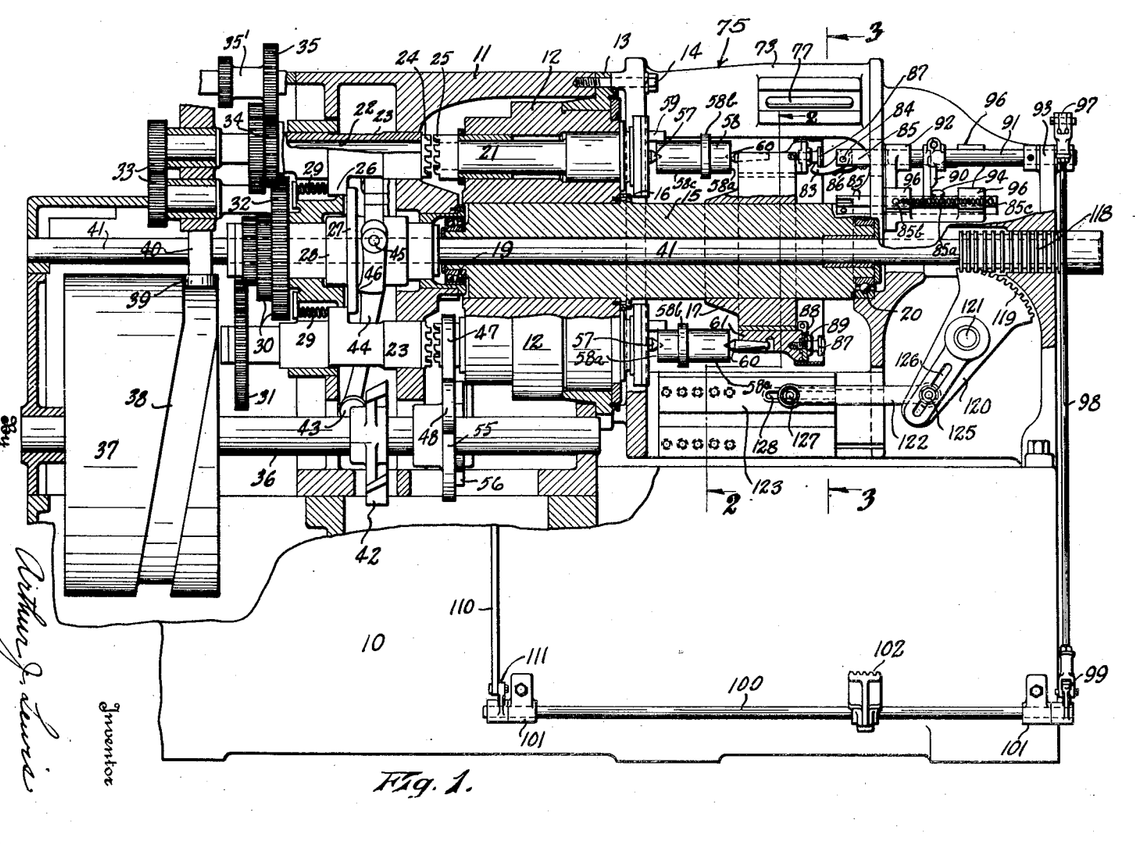
Fig. 1 is a vertical longitudinal section through the machine with certain elements shown in elevation.
Figures 1, 2:
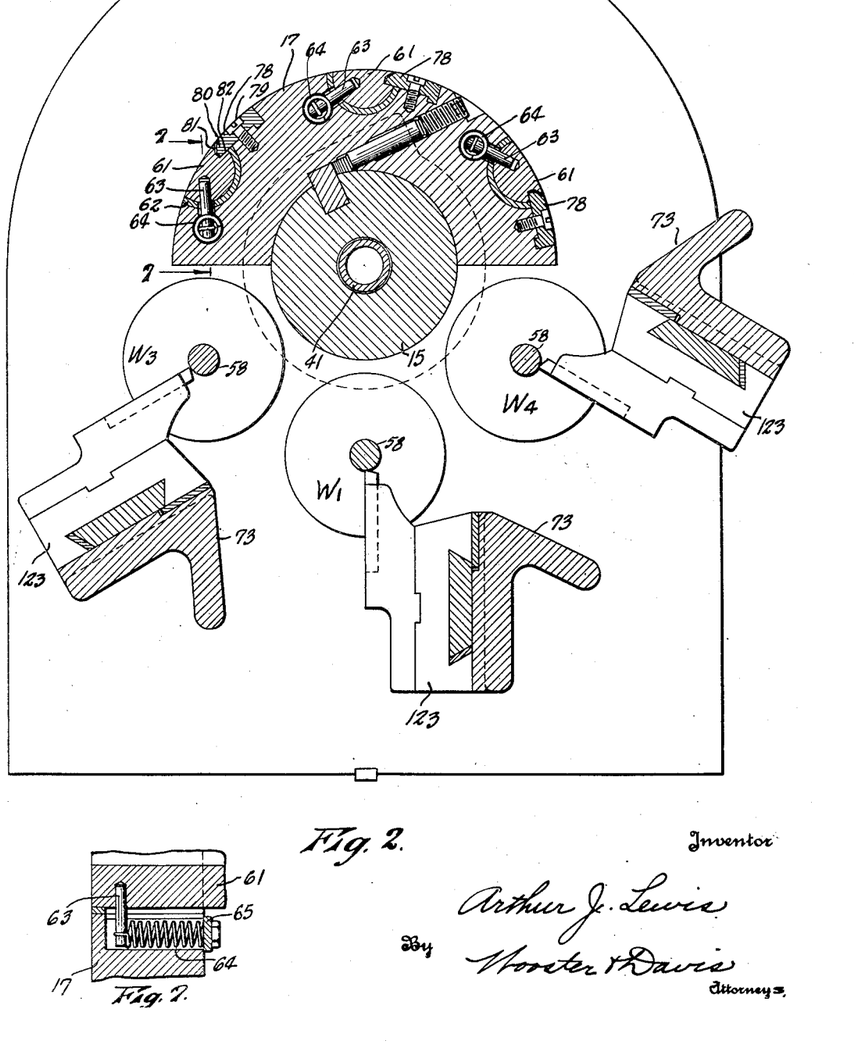
Fig. 2 is a transverse section substantially on line 2—2 of Fig. 1.

Each of the spindles at the working stations is driven from a suitable source of power by a driving spindle 22 mounted in a longitudinally slidable bearing member 23. Each spindle 22 carries a clutch member 24 adapted to engage a clutch member 25 on the work spindle at that station. Thus, the work spindles are individually driven at the various working stations by a detachable clutch drive 24 and 25. There is one drive shaft 22 at each working station and the clutch on each drive shaft is engageable with the clutch on the work spindle which happens to be located at that particular station so as to drive that spindle. The bearing member 23 for each driving spindle 22 is mounted to slide in the frame 11 so as to move the clutch member 24 from and to engagement with the clutch members 25 on the work spindles. These bearing members may have laterally extending lugs 26 adapted to engage a flange 27 on a longitudinally slidable member 28 to shift the shafts 22 to the left away from the work spindles 21 and disconnect the clutches 24, 25 to permit indexing of the turret, these shafts being shown retracted in Fig. 1 so that the clutches are disengaged for the indexing operation. Springs 29 engaging the lugs 26 tend to shift the bearing members in the opposite direction to bring clutches 24, 25 into engagement and thus drive the work spindles. The mounting for these drive shafts and driving means therefor is preferably similar to that disclosed in my co-pending application for chucking machine, Serial No. 362,974, filed May 14, 1929. The individual driving shafts 22 are driven from a central set of gears 30 through individual gears 31, and as the gears 30 may be of different diameters and gears 31 of different diameters to mesh with the different gears 30, the individual work spindles may be driven at different speeds at the various working stations according to the work to be done. Gears 30 may be driven from any suitable source of power, not shown, through the gear chain 32, 33, 34, 35.

Also driven from the power mechanism so as to be operated in timed relation therewith is a main cam shaft 36 carrying a main cam drum 37. It is driven through the feed mechanism shown diagrammatically in Fig. 4 and includes the clutch 130. This drum may carry one or more cams for operating certain tools at the various work stations. In the present instance, there is shown only one cam groove 38 which operates a roller 39 connected by a block 40 to an operating rod 41. This rod extends through the center of the turret beyond the end of the extension 15 and carries means for operating the various tool slides or carrier as will presently be described.

Cam shaft 36 also carries a cam 42 for withdrawing the drive spindles 22 to disconnect the clutches 24, 25 at the various working stations, the cam cooperating with a roller 43 on a lever 44 pivoted at 45 and having a fork including lugs 46 to engage the flange 27. It will be clear that when the roller 43 is swung to the left as viewed in Fig. 1, member 28 will be shifted to the left and carry with it the bearing members 23, drive shafts 22 and clutch members 24.

Figure 6:
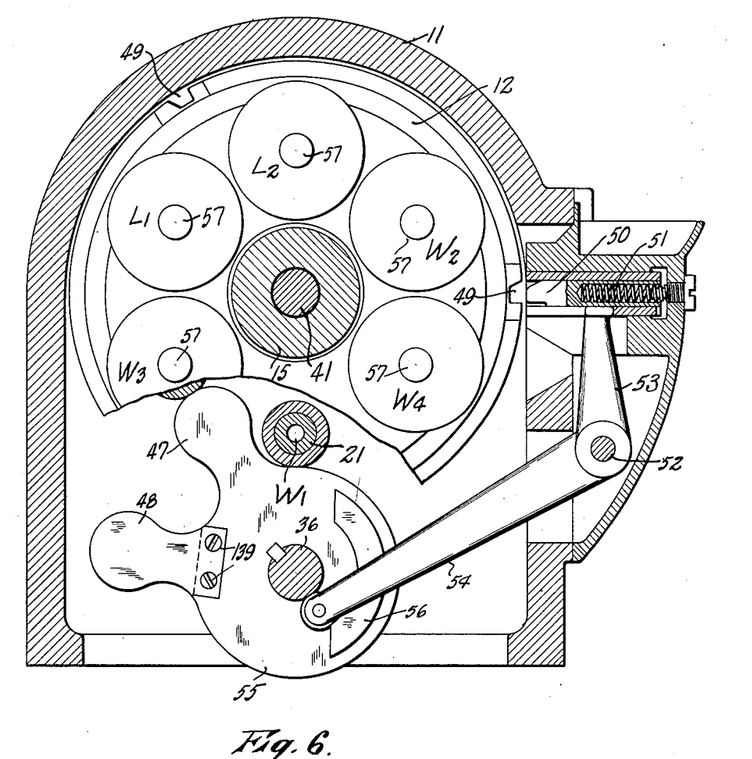
Fig. 6 is a cross section showing the indexing mechanism.

Shaft 36 also carries means for indexing the turret and is formed of one or more arms 47 and 48 keyed to the shaft 36. These arms engage the projecting ends of the spindles 21 to index the turret and its extension 15. The indexing means is shown more clearly in Fig. 6. Either one of these arms may be removably mounted on the support. In the present instance arm 48 is so mounted.

Means is also provided for locking the turret and its extension between successive indexing operations. Thus, in the rim of the turret is provided a plurality of suitably spaced notches 49 to be engaged by the end of a locking bolt 50 slidably mounted to move toward and from the turret. A spring 51 tends to move the locking bolt toward locking position to cause its end to seat in one of the notches 49. This locking bolt is automatically operated by means of a lever pivoted at 52 and having an arm 53 to engage the bolt 50 and another arm 54 carrying a roller 55 cooperating with the cam 56 on the shaft 36. This cam operates the bolt through the lever to unlock the turret and its extension just prior to the indexing operation, and when the indexing operation is completed permits the end of the bolt to move into one of the notches 49 to lock the turret and its extension against rotary movement until time for the next indexing operation.

Each working spindle 21 carries means for supporting one end of the work and also driving the work. In the present instance these work supporting means are shown as centers 57 to seat in the center recesses in one end of the work which is indicated diagrammatically at 58. Any suitable dog or driving means 59 is carried by the spindle for rotating the work. The other end of each piece of work is also supported, in the present instance, by means of a tail center 60 mounted on a suitable carrier 61 mounted for sliding movement in the extension block 17 of the turret. Thus, each piece of work is supported at its opposite ends on aligned supporting means carried respectively by the work spindle in the turret and the turret extension, and one of these supporting means is movable longitudinally toward and from the other to permit insertion and removal of the work between the supports. Ordinarily these supports are centers on which the work may turn, as such supports automatically center the work, but the supports need not necessarily be of this type.

Each carrier 61 for carrying the end support in the turret extension as mentioned above is movable longitudinally of the axis of the work spindles toward and from the supporting means carried by these spindles to permit insertion and removal of the work pieces and also to permit taking up of any looseness or back lash or any play there might be between the work pieces and the supporting centers. Thus, the carriers 61 are slidably mounted in the block 17, or that is, the extension of the turret. Each block is guided in a suitable bearing bushing 62 in the block 17 and carries a laterally extending pin 63 which is connected to a coil spring 64. The other end of this spring is connected to a block 65 mounted on the member 17 by any suitable means such as a bolt 66, and the spring tends to shift the carrier 61 and the work supports 60 toward the work spindle supports 57. Each carrier 61 has a projecting end 67 on which is keyed an arm 68 and each arm carries an adjustable screw 69 to cooperate with a locking roller 70. Screw 69 may be adjusted in the arm 68 and clamped in adjusted position by lock nut 71.

There is a locking roller 70 located at each working station. It may be mounted by any suitable means, but is preferably mounted on an adjustable block 72 so as to be adjusted longitudinally on a support 73, being secured thereto by a suitable bolt 74. The supports 73 are part of a suitable bracket construction 75 carried by the frame of the machine and may be secured thereto by the bolts 14. The rollers 70 are of sufficient length to engage the screw 69 within limits of the movement of the centers 16 taking up back lash or looseness on the work, and to compensate for variations in the length of work pieces. They may also be adjusted longitudinally of the axis of the work spindles on the guides 76, the bolts 74 being in elongated slots 77.

Associated with each carrier 61 is a locking block 78 secured in the turret extension block 17 as by screws 79 and having an end 80 projecting into a longitudinal groove 81 in the side of the member 61. Thus, when the member 61 is rotated slightly by engagement of the screw 69 on a roller 70, the shoulder 82 on one side of this groove is clamped against the inner side of the block 78 and thus locks the carrier 61 against movement longitudinally of the axes of the spindles, but as soon as the end of screw 69 runs off the roller 70, this lock is released and the carrier 61 may be moved longitudinally either under the action of the spring 64 or by a manually operated retracting means presently to be described. It will be understood that these locking rollers 70 are provided only at the working stations so that when the work spindles are at the loading stations or are moving between successive stations, the carriers 61 are unlocked and are free to be shifted.

Figure 3:
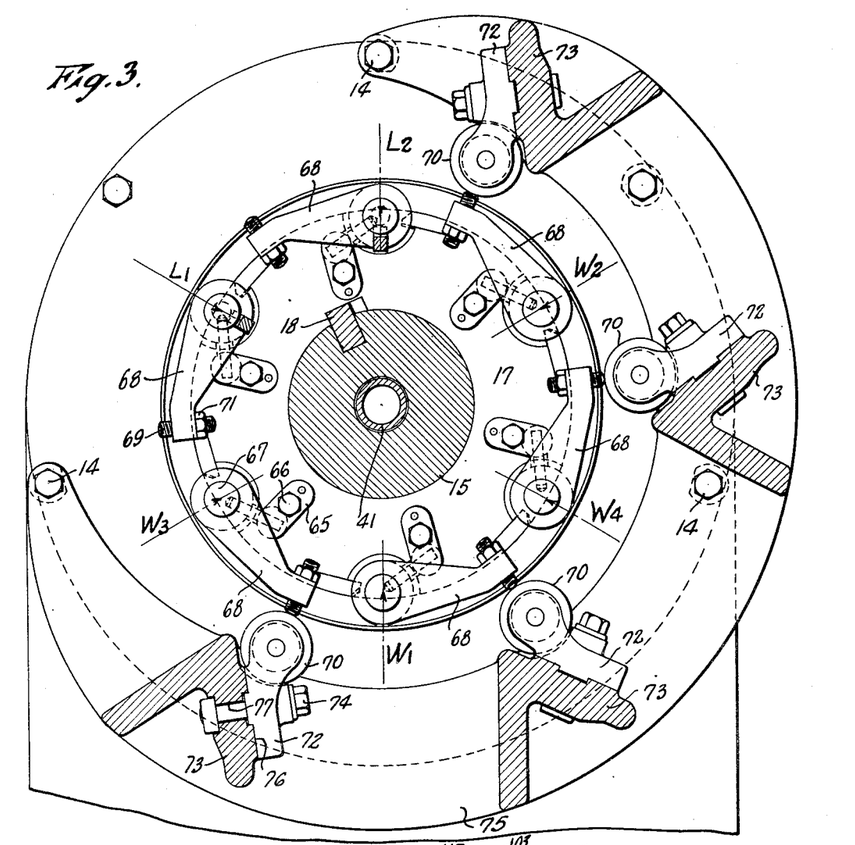
Fig. 3 is a transverse section substantially on line 3—3 of Fig. 1.

In the present machine, I have shown an arrangement providing two loading stations and four working stations. Thus, referring to Fig. 3 the spindles at the two stations $L_1$ and $L_2$ are at the loading stations, while the spindles at stations $W_1$, $W_2$, $W_3$ and $W_4$ are at the working stations, but it will be understood of course that other arrangements may be employed such as for instance using only one loading station and five working stations. This latter will be accomplished by adding tools and locking means at either one of the stations $L_1$ or $L_2$ and providing a gear 31 on the driving spindle at that station, and also changing the indexing mechanism to index the turret and extension at one station at a time. That is, to shift the turret to carry the spindles only the distance between two adjacent spindles at each indexing operation. This can be done by removing the indexing arm 48.

As indicated above, in the present layout, there are two loading stations $L_1$ and $L_2$ and four working stations. Therefore, with this arrangement it is preferred to double index the turret and its extension. That is, at each indexing operation the turret and its extension are indexed to carry each spindle a distance equal to twice the distance between two adjacent spindles. This is accomplished by the two arms 47 and 48 engaging two successive spindles on each revolution of the cam shaft 36. In other words, in each indexing operation, the spindle at loading station $L_1$ is shifted to working station $W_1$, the spindle at $W_1$ is shifted to $W_2$ and the spindle at $W_2$ is shifted to $L_1$. Similarly on the same indexing operations the spindle at $L_2$ is shifted to $W_3$, spindle at $W_3$ to $W_4$, and the spindle at $W_4$ to $L_2$.

At each loading station is provided manually operated means for retracting the tail support 60 at this station to permit insertion of the work pieces to be operated upon and removal of the pieces which have been operated upon. Thus, at each loading station is provided a hook 83 pivotally mounted at 84 on a sliding bar 85 with a spring 86 tending to move the hook to engage behind a flange or head 87 on an adjustable bolt 88 carried on each carrier 61. These adjustable bolts may be secured in adjusted position by lock nuts 89, and as the spindles are carried to the loading station or stations during the indexing operation, these hooks 83 automatically engage behind the flanges 87. It will be understood that if the hooks 83 are now shifted to the right, they will shift the corresponding carriers 61 and the centers 60 carried thereby with them, and thus move these centers away from the work 58 to permit either removal of the work which has already been machined or the insertion of new work for the machining operations. A spring $85_a$ secured to each bar 85 at $85_c$ and to a part of the frame as bearing 96 at $85_b$ tends to shift its respective bar 85 to the left or toward the extension 17 and hold it in position for hooks 83 to engage back of heads 87.

Figure 5:
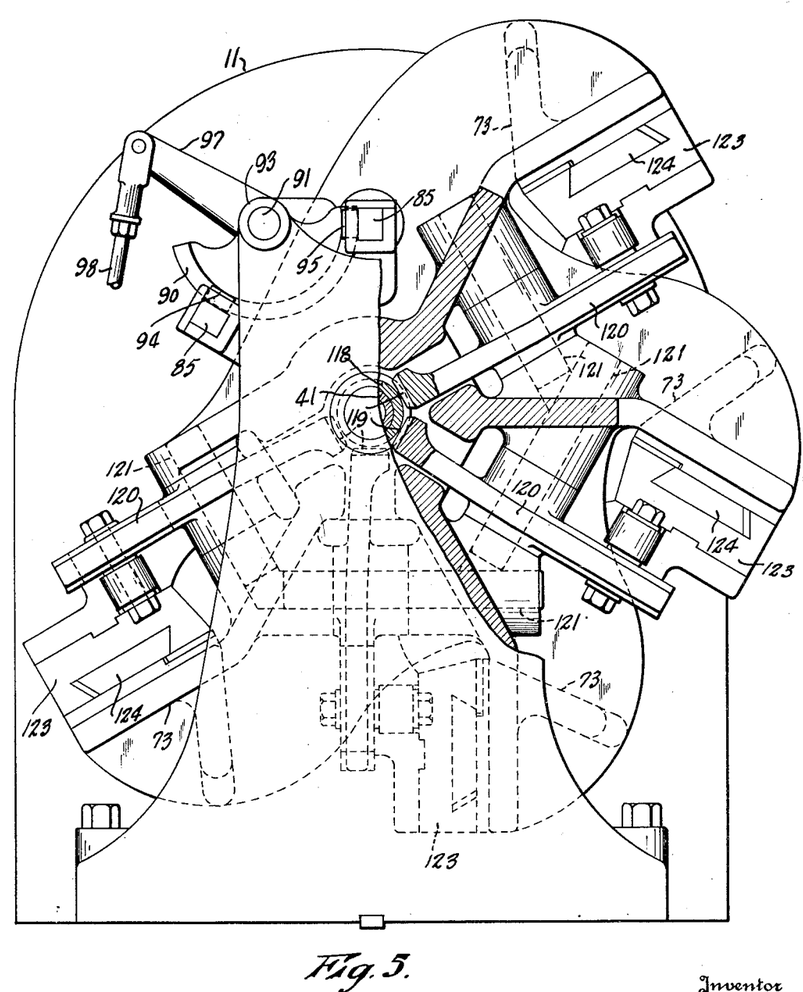
Fig. 5 is a partial end view and partial section looking from the right of Fig. 1.

For retracting these centers 60 at the loading stations there is provided a cam 90 mounted on an oscillating shaft 91, this shaft being mounted in suitable bearings 92 and 93. See Figs. 1 and 5. The cam 90 is adapted to engage rollers 94 and 95 on the sliding bars 85 carrying the hooks 83 at the two loading stations. The bars 85 are preferably non-circular, such as square, and are mounted in similarly shaped bearings 96 so as not to turn therein. It is to be understood that the roller 94 is on the bar 85 at loading station $L_1$ while roller 95 is on the bar 85 at loading station $L_2$, and the cam 90 is preferably so shaped and located that when operated it will shift one of the bars 85 before the other so as to shift the center 60 at one of the loading stations before shifting the center at the other station. Thus, for example, the cam when operated may first withdraw the support 61 at loading station $L_2$ to permit removal of work which has been entirely finished and then on further operation of the cam withdraw the support 61 at station $L_1$ to permit removal of the piece of work only partially finished, and on reverse movement of the cam one of the center supports will be released to engagement with the work before the other, so that it is not necessary to handle two pieces of work at the same time. Of course, if preferred the center 60 at $L_1$ may be withdrawn first and then the center at $L_2$.

The shaft 91 is manually operated to retract the center support 60 by means of a lever arm 97 secured to the shaft and which is connected by means of a rod 98 with a lever arm 99 on a shaft 100 mounted in suitable bearings 101 on the side of the bed 10. A foot pedal 102 is mounted on this shaft so that on depression of the pedal the shaft is turned and through the connection 98 will turn the shaft 91 and the cam 90. This manually operated means is also connected to a safety device which will prevent indexing of the machine until the foot has been removed from the member 102 and the work supports 60 are back in their proper work holding position. It will also prevent depression of the foot pedal while the machine is indexing. This is shown more clearly in Fig. 4 in which lever 103 is a hand lever connected to a driving clutch 130 for driving the feed mechanism through gear train 131 to 135, and driven from the power drive 35′ for the machine. This clutch is connected to drive the feed and indexing mechanism as disclosed in my prior application for automatic chucking machine, Serial No. 310,156, filed October 3, 1928. This lever 103 has a lug 104, and there is a rod 105 whose free end 106 cooperates under certain conditions with lug 104. This rod is connected to a lever 107 carrying a roller 108 cooperating with a cam 109 on the cam shaft 36. This cam may be mounted on drum 37. The rod 105 passes through an opening adjacent the upper end of a link 110 which is connected to a lever arm 111 on the shaft 100. A spring 112 is connected at 113 to the link 110 and at 114 to the stationary lug 115 and tends to draw this link upwardly. When the arm 103 is in the full line position shown, in Fig. 4 the feed is operating as the clutch 130 is engaged. When the arm 103 is thrown over to the dotted line position the feed clutch 130

Figure 4:
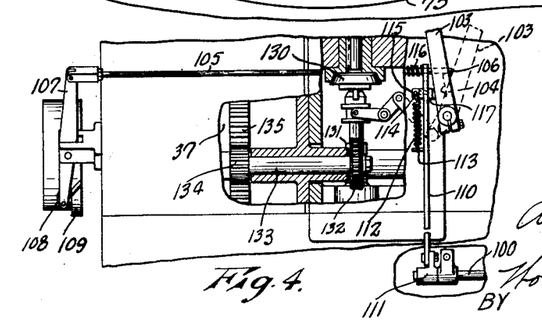
Fig. 4 is a side elevation showing a part of the automatic safety means.

130 is out and the feed can not operate and the turret will not index. A spring 116 on the bar 105 is connected at one end to the bar and engages a link 110 so it tends to shift the bar 105 to the left as the link 110 is held against lateral movement by being guided in bracket 117. The cam 109 is so arranged that it throws the bar 105 to the right just before the indexing operation. If the pedal 102 is not depressed, the rod 105 merely passes over the top of the lug 104 and remains there during the indexing operation as it is held in this position by the cam 109 until the indexing of the turret has been completed, when it is moved back under the action of spring 116 so that its end 106 lies to the left of lug 104. It will be evident that as bar 105 is over the lug 104 during the indexing operation, if the operator tries to depress the pedal 102 while the turret is indexing, he will not be able to do so because the rod 105 will be held in the elevated position by the lug 104. It will also be evident that after the indexing operation is completed, he may depress pedal 102 because the end 106 lies to the left of lug 104. Still further, if the loading operation has not been completed when it is time for the next indexing operation to commence and he, therefore, still has pedal 102 depressed, the end 106 of bar 105 is below the top of the lug 104 and at the left side of this lug as the cam 109 shifts rod 105 to the right just before the indexing begins. Under these conditions the rod 105 will engage the lug 104 and shift lever 103 to the dotted line position and release the feed clutch 130 and stop the feeding and indexing mechanism. This prevents any possibility of the turret being indexed while the pedal 102 is depressed and any of the tail pieces 60 withdrawn from their work. After the loading is completed, the operator releases the pedal 102 which permits the link 110 and bar 105 to be raised by spring 112. He can now throw the lever 103 to the left to throw in clutch 130 and again start the feeding and indexing mechanism. This safety feature is similar to that shown in my co-pending application for automatic chucking machine, Serial No. 310,156 referred to.

It is stated above that there are tools and tool slides at the various working stations. In the present construction, all the tools at the four working stations are operated from the single feed motion or bar 41. On this bar is mounted a cylindrical rack 118 which meshes with segmental gears 119, there being at least one of these segmental gears at each working station. They are each mounted on a lever 120 pivoted in the frame at 121, and a link 122 connects this lever to a tool slide 123, there being at least one tool slide at each working station. The tool slide is guided for movement longitudinally of the work in suitable guides 124 and the tool carrier may or may not have movement on these slides transversely of the axis of the work as is found desirable. The link 122 is pivoted to the lever 120 at 125 in elongated slot 126 and is pivoted at 127 to the slide 123 in a similarly elongated slot 128. By adjusting pivot 125 in the slot 126 toward or from the pivot 121 it will be evident the length of stroke of each individual tool may be adjusted as desired and, therefore, even though all the tools are operated by one feed motion they may each have a different length of stroke. By adjusting the pivot 127 in the slot 128 the position of the tool relative to the work may be adjusted. It is preferred that the tool slides 123 be located outside the path of movement of the axes of the work spindles and the work, as this places all tools and their mountings where they are easily accessible for adjustment, mounting and so forth, and where they can be removed or adjusted without interferring with other tools or the work.

It will be evident from the above that with this machine a series of turning operations can be simultaneously performed on different work pieces rotating on centers, and that the work can be indexed while still supported on the centers to carry it to the different loading and working stations. With the double indexing arrangement as illustrated a piece of unfinished work 58 may be loaded on centers at the loading station $L_1$ and then on the next indexing operation it will be carried to working station $W_1$ where certain machining operations can be performed. Then on the next indexing operation it will be carried to station $W_2$ where other machining operations can be performed. The next indexing operation will carry this piece of work back to loading station $L_1$ where it can be removed from the centers by the operator after he has withdrawn the center 60 at this station by depressing pedal 102 and thus operating the associated mechanism including the hook 83. If other machining operations are to be performed on this same piece, it can be transferred to loading station $L_2$. Then on the next indexing operation it will be carried to working station $W_3$ where certain operations may be performed. In a subsequent indexing it will be carried to station $W_4$ where still other operations can be performed, and then it will be again returned to station $L_2$ on the next indexing operation, where it may be removed as a finished piece. Thus, it will be evident that with this machine, a number of turning or other machining operations may be performed simultaneously on a number of different pieces of work. Thus, for example, a piece of work may go through stations $W_1$ and $W_2$ and have certain turning or other machining operations performed thereon at one end as for example from outer end $58_A$ to flange $58_B$ and then be removed from the machine and be reversed for example and again placed in the machine at station $L_2$ and have turning or other machining operations performed from the other end $58_c$ at stations $W_3$ and $W_4$, or if only two operations are required to finish a piece, two unfinished pieces may be placed on the centers at $L_1$ and $L_2$, and then after going to the various working stations be removed from the machine as finished pieces from stations $L_1$ and $L_2$.

If it is desired to use the machine as a single indexing machine, tools and a drive shaft are provided at one of the loading stations say for example, station $L_2$. This station then becomes an additional working station. Also the second indexing arm 48 is removed from the support 54, it being detachably connected thereto by any suitable means such as bolts 129. Thus, it will be evident that at each indexing operation, the turret and its extension will be indexed only sufficient to carry the work from one station to the next adjacent station, so that each piece of work passes in succession to all the working stations and back to the loading station $L_1$ where it can be removed as a finished piece.

A particular advantage of this machine is that the movable centers for supporting one end of the work are each released between successive working operations, and if there is any looseness or back lash between the centers and the work, this is automatically taken up before the next working operation, and then at the next working operations the centers are all firmly clamped and held in proper position. Thus, if during one working operation the bearing surfaces between the work and its center supports should wear to cause any looseness or back lash, or should a center be shifted slightly with the same result, this looseness or back lash will be automatically taken up and eliminated before the next working operation, thus making the machine very accurate and fine finishing work can be performed on it.

Having thus set forth the nature of my invention, what I claim is:

1. In a machine of the character described, an indexing turret, a plurality of spindles in the turret, means on each spindle for supporting one end of a piece of work and driving it, an extension connected to the turret and extending forwardly therefrom, means on the extension for supporting the other ends of the work and movable toward and from the work, means for indexing the turret and extension, means for clamping the movable work supporting means in position at the working stations, means operated in timed relation with the indexing means for operating the clamping means, and means to urge the holding means on the extension toward the holding means on the turret during the indexing operation.

2. In a machine of the character described, an indexing turret, a plurality of work spindles in the turret providing loading and working stations, a center on each spindle for supporting one end of the work, work driving means on the spindles, an extension connected to the turret, centers on the extension in alignment with those on the turret to support the other ends of the work and movable toward and from the first centers, means for indexing the turret and extension, means for clamping the second centers against movement at the working stations, means operated in timed relation with the indexing means to release the clamping means between working operations, and means for shifting the second centers toward the first centers between working operations to take up slack between the centers and the work.

3. In a machine of the character described, an indexing turret, a plurality of work spindles in the turret providing loading and working stations, a center on each spindle for supporting one end of the work, work driving means on the spindles, an extension within the path of movement of the centers and connected to the turret for movement therewith, centers on the extension in alignment with the first centers to support the other ends of the work and movable toward and from the first centers, means for indexing the turret and extension, tool carrying means at the working stations outside the path of movement of the centers, means for shifting the second centers toward the first centers between working operations to take up slack between the centers and the work, and means operated in timed relation with the indexing means to control said shifting means.

4. In a machine of the character described, an indexing turret, a plurality of work spindles in the turret providing loading and working stations, means on the spindles for supporting one end of the work, an extension connected to the turret and movable therewith, means on the extension for supporting the other ends of the work, and means operated in timed relation with the indexing for releasing one of the supporting means and taking up slack between the work and the supporting means between working operations.

5. In a machine of the character described, an indexing turret, a plurality of work spindles in the turret proving loading and working stations, centers on the spindles for supporting one of the ends of work to be operated upon, an extension connected to the turret and movable therewith, centers on the extension in alignment with the first centers for supporting the other ends of the work, one set of centers being movable toward and from the others, means for shifting said movable centers between working operations to take up slack between the centers and the work, and means operated in timed relation with the indexing to control said shifting means.

6. In a machine of the character described, an indexing turret, a plurality of work spindles in the turret providing loading and working stations, centers on the spindles for supporting one of the ends of work to be operated upon, an extension connected to the turret and movable therewith, centers on the extension in alignment with the first centers for supporting the other ends of the work and movable toward and from the first centers, springs tending to move the second centers toward the first centers, and means operated in timed relation with the indexing for clamping the movable centers at the working stations during machining operations and releasing them between such operations.

7. In a machine of the character described, an indexing turret, a plurality of work spindles in the turret providing loading and working stations, centers on the spindles for supporting one end of the work to be operated upon, an extension connected to the turret to move therewith and extending forwardly therefrom within the path of movement of the centers, centers on the extension in alignment with those on the turret for supporting the other ends of the work and movable toward and from the first centers, tool carriers at the working stations outside the path of movement of the centers, springs tending to shift the second set of centers toward the first, and means operated in timed relation with the indexing for clamping the centers against such movement at the working stations and for releasing them between working operations.

8. In a machine of the character described, an indexing turret, a plurality of work spindles in the turret providing loading and working stations, means on the respective spindles for supporting one end of the work and driving it, an extension connected to the turret and movable therewith, means carried by the extension for supporting the other ends of the work and movable toward and from the first supports, tools at the working stations, means for automatically operating the tools and indexing the turret in certain timed relation, means operated in timed relation with the indexing for automatically clamping the second work supports in position at the working stations and releasing them between working operations, and means for shifting these supports toward the first supports when released.

9. In a machine of the character described, a frame, an indexing turret mounted for turning movement in the frame, a plurality of work spindles in the turret providing loading and working stations, means on the respective spindles for supporting one end of the work and means for driving the work, an extension connected to the turret and movable therewith, supporting means for the extension supported on the frame at the opposite end from the turret, supports for the other ends of the work on the extensioin in alignment with those on the spindles and movable toward and from the spindles, tool carriers at the working stations, means for indexing the turret and extension, means operated in timed relation with the indexing means for automatically locking the supports on the extension at the working stations, and means for shifting said supports toward the spindles between working operations.

10. In a machine of the character described, a plurality of pairs aligned work carrying centers providing a plurality of working stations, a center of each pair being capable of movement toward and from the other center, means at the different stations for performing different turning operations on the work, means for shifting the centers to carry the work to the respective stations, automatic means operated in timed relation with the shifting means for clamping the movable centers at the working stations, and automatic means for shifting said centers between working operations to take up back lash between the work and the centers.

11. In a machine of the character described, a plurality of pairs of aligned work carrying centers providing a plurality of working stations, a movable support for a center of each pair, springs tending to shift the movable supports to shift the centers carried thereby toward the aligned centers, means for indexing the centers to carry the work to different stations, means at the different stations for performing different turning operations on the work, and automatic means operated in timed relation with the indexing means for clamping the movable supports at the working stations and releasing them between working operations.

12. In a machine of the character described, an indexing turret, a plurality of work spindles carried by the turret providing loading and working stations, work supporting centers on said spindles, an extension connected to the turret to move therewith, work supporting centers on the extension in alignment with those on the spindles and movable toward and from them, means for indexing the turret and the extension, spring means to move the second centers toward the first centers, means operated in timed relation with the indexing means for clamping the second centers at the working stations and releasing them between successive operations, and manually operable means at the loading station to withdraw the work center at that station against the action of the spring to release the work.

13. In a machine of the character described, an indexing turret, a plurality of work spindles carried by the turret providing two loading stations and a plurality of working stations, work supporting means on said spindles, an extension connected to the turret to move therewith, work supporting centers on the extension in alignment with the spindles and movable toward and from the spindles, and a manually operable release mechanism adapted to withdraw the centers from the work at the loading stations, said release mechanism being adapted to withdraw first one center and then the other by a continuous movement.

14. In a machine of the character described, an indexing turret, a plurality of work spindles carried by the turret providing two loading stations and a plurality of working stations, work supporting means on said spindles, an extension connected to the turret to move therewith, work supporting centers on the extension in alignment with the spindles and movable toward and from the spindles, and a manually operable release mechanism adapted to withdraw the centers from the work at the loading stations, said release mechanism being adapted to withdraw first one center and then the other by a continuous movement, and adapted on reverse movement to allow one center to engage the work before the other.

15. In a machine of the character described, an indexing turret, a plurality of work spindles carried by the turret providing loading and working stations, work supporting centers on said spindles, an extension connected to the turret to move therewith, work supporting centers on the extension in alignment with those on the spindles and movable toward and from them, spring means to move the second centers toward the first centers, automatic means for indexing the turret and extension, manually operable means at the loading station to withdraw the work center at that station against the action of the spring to release the work, and means operated in timed relation with the indexing means to prevent said manual operation while the turret is indexing.

16. In a machine of the character described, a rotatable turret, a plurality of work spindles in said turret, a plurality of tool slides adjacent the spindles, a central longitudinally slidable bar, a plurality of pivoted levers connected to said bar, connections from the respective levers to the respective tool slides including means for adjusting the connection toward and from the pivot for the lever to vary the stroke of the tool slide, and means for operating said bar and indexing the turret in timed relation.

17. In a machine of the character described, aligned work carrying centers, a plurality of means for turning work in successive operations on said centers, means for mounting one of aligned centers for movement toward and from the other, and means for automatically shifting the movable center toward the other between successive operations to take up back lash between the centers and the work.

18. In a machine of the character described, a plurality of sets of aligned work carrying centers providing a plurality of working stations, means mounting one of the centers of each set for movement toward and from the other, means at the respective stations for turning work in successive operations on said centers, means for shifting the work from station to station, and automatic means for shifting the movable centers between successive working operations to take up back lash between the work and the centers.

In testimony whereof affix my signature.
ARTHUR J. LEWIS.